(12) United States Patent
Xie et al.

(10) Patent No.: US 11,458,382 B2
(45) Date of Patent: Oct. 4, 2022

(54) IMMERSIVE UPPER LIMB REHABILITATION TRAINING SYSTEM

(71) Applicant: SOUTH CHINA UNIVERSITY OF TECHNOLOGY, Guangdong (CN)

(72) Inventors: Longhan Xie, Guangdong (CN); Shuangyuan Huang, Guangdong (CN); Siqi Cai, Guangdong (CN); Guofeng Li, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 354 days.

(21) Appl. No.: 16/630,461

(22) PCT Filed: Dec. 28, 2018

(86) PCT No.: PCT/CN2018/124878
§ 371 (c)(1),
(2) Date: Jan. 12, 2020

(87) PCT Pub. No.: WO2020/098112
PCT Pub. Date: May 22, 2020

(65) Prior Publication Data
US 2021/0060406 A1    Mar. 4, 2021

(30) Foreign Application Priority Data
Nov. 14, 2018 (CN) .......................... 201811354131.4

(51) Int. Cl.
*A61H 1/02* (2006.01)
*A63B 71/06* (2006.01)
(Continued)

(52) U.S. Cl.
CPC ....... *A63B 71/0622* (2013.01); *A61H 1/0274* (2013.01); *A63B 23/12* (2013.01);
(Continued)

(58) Field of Classification Search
CPC .. A61H 1/0274; A61H 1/0277; A61H 1/0281; A61H 1/0285
(Continued)

(56) References Cited

U.S. PATENT DOCUMENTS

2003/0223844 A1* 12/2003 Schiele ................. A63B 23/12
414/5
2008/0009771 A1* 1/2008 Perry ................... A61H 1/0281
600/587
(Continued)

FOREIGN PATENT DOCUMENTS

| CN | 101574297 | 11/2009 |
|---|---|---|
| CN | 102567638 | 7/2012 |

(Continued)

OTHER PUBLICATIONS

Frisoli et al. "A force-feedback exoskeleton for upper-limb rehabilitation in virtual reality", Applied Bionics and Biomechanics, vol. 6, No. 2, Jun. 2009. (Year: 2009).*

(Continued)

*Primary Examiner* — Bradley H Philips
*Assistant Examiner* — Savannah L Gabriel
(74) *Attorney, Agent, or Firm* — JCIPRNET

(57) ABSTRACT

An immersive upper limb rehabilitation training system includes a dual-arm rehabilitation robot, a base, a position tracker, a VR headset, a force-feedback glove, a host computer control center and passive compliant end-effectors. The dual-arm rehabilitation robot is mounted on the base, and drives an arm of a patient to move through two passive compliant end effectors. The visual sensor is used for recording a motion of an upper limb of the patient and feedback-controlling a motion of the dual-arm rehabilitation robot. The position tracker is used for real-time collecting position and posture information of the arm and transmitting (Continued)

it to the upper computer control center. The two passive compliant end-effectors are respectively worn on a forearm and an upper arm of the patient. The upper computer control center is used to provide a quantitative index and control a display of a training screen.

9 Claims, 3 Drawing Sheets

(51) Int. Cl.
  *A63B 23/12* (2006.01)
  *G06F 3/01* (2006.01)
(52) U.S. Cl.
  CPC ............ *A61H 2201/0103* (2013.01); *A61H 2201/0173* (2013.01); *A61H 2201/165* (2013.01); *A61H 2201/5061* (2013.01); *A61H 2201/5064* (2013.01); *A61H 2201/5092* (2013.01); *A61H 2230/625* (2013.01); *A63B 2071/0636* (2013.01); *A63B 2220/13* (2013.01); *A63B 2230/625* (2013.01); *G06F 3/011* (2013.01)
(58) Field of Classification Search
  USPC .................................................. 434/247, 258
  See application file for complete search history.

(56) References Cited

U.S. PATENT DOCUMENTS

| | | | |
|---|---|---|---|
| 2009/0131225 A1 | 5/2009 | Burdea et al. | |
| 2009/0149783 A1* | 6/2009 | Nef | A63B 21/4049 601/5 |
| 2012/0157263 A1* | 6/2012 | Sivak | A61B 5/7475 482/4 |
| 2014/0336542 A1* | 11/2014 | Fu | A61H 1/0277 601/5 |
| 2016/0206497 A1* | 7/2016 | Deshpande | A61H 1/02 |
| 2017/0132947 A1* | 5/2017 | Maeda | A63B 21/00178 |
| 2017/0326405 A1* | 11/2017 | Choi | A63B 71/0622 |
| 2018/0214761 A1* | 8/2018 | Olds | G09B 19/003 |
| 2019/0201273 A1* | 7/2019 | Soltani-Zarrin | B25J 9/0006 |

FOREIGN PATENT DOCUMENTS

| | | |
|---|---|---|
| CN | 102813998 | 12/2012 |
| CN | 104991639 | 10/2015 |
| CN | 107595547 | 1/2018 |
| WO | 2017219226 | 12/2017 |

OTHER PUBLICATIONS

"International Search Report (Form PCT/ISA/210) of PCT/CN2018/124878," dated Jun. 27, 2019, pp. 1-5.

* cited by examiner

IMMERSIVE UPPER LIMB REHABILITATION TRAINING SYSTEM

CROSS-REFERENCE TO RELATED APPLICATION

This application is a 371 of international application of PCT application serial no. PCT/CN2018/124878, filed on Dec. 28, 2018, which claims the priority benefit of China application no. 201811354131.4, filed on Nov. 14, 2018. The entirety of each of the above mentioned patent applications is hereby incorporated by reference herein and made a part of this specification.

BACKGROUND

Technical Field

The invention relates to the field of upper limb rehabilitation, and particularly relates to an immersive upper limb rehabilitation training system.

Description of Related Art

With the improvement of living standards, proportion of aging population continues to increase. Stroke is a high-risk disease in elderly people. Hemiplegia caused by the stroke will greatly affect daily life of a patient. Through systematic and scientific training of an upper limb rehabilitation robot, the patient with hemiplegia can recover his physical activity range, muscle strength, flexibility, etc., and improve his daily living ability. Rehabilitation process is currently based on experiences of a rehabilitation therapist and there is a difference even if in training the same patient for the same motion. There is a large error in an evaluation of the patient based on the experiences of the rehabilitation therapist or scale. During the rehabilitation process, the patient tends to be boring, and his mood after the illness is relatively low. There may be cases of poor enthusiasm for rehabilitation and noncompliance, which affect the rehabilitation effect.

SUMMARY

The invention discloses an immersive upper limb rehabilitation training system, which is applied to an exercise of an upper limb rehabilitation training process, comprising a visual sensor height angle adjuster, a visual sensor, passive compliant end-effectors, a dual-arm rehabilitation robot, a base, a position tracker, a VR headset, a force-feedback glove, a VR third-person view display device, an upper host control center, and realizes a safe, scientific, interesting and data-oriented upper limb rehabilitation training process.

In order to achieve the above object, technical solutions of the invention are as follows.

The immersive upper limb rehabilitation training system includes the dual-arm rehabilitation robot, the base, the position tracker, the VR headset, the force-feedback glove, the host computer control center and the passive compliant end-effectors. The dual-arm rehabilitation robot is mounted on the base, and drives an arm of a patient to move through two passive compliant end-effectors. The visual sensor is mounted on the base through the visual sensor height angle adjuster. The visual sensor is used for recording a motion of an upper limb of the patient, extracting spatial position information of the upper limb of the patient, and feedback-controlling a motion of the dual-arm rehabilitation robot. The position tracker is mounted on the arm of the patient, and is used for real-time collecting position and posture information of the arm of the patient, and transmitting the collected position and posture information of the arm to the upper computer control center as a feedback of a control system of the dual-arm rehabilitation robot. The VR headset is worn on a head of the patient, and is used for bringing an immersive training experience to the patient through VR. The force-feedback glove is worn on a hand of the patient, and is used for enhancing the immersive training experience, improving a patient's reality in a virtual environment, and providing a force feedback parameter for a control of the dual-arm rehabilitation robot. The passive compliant end-effectors are mounted on an end of the dual-arm rehabilitation robot, and are respectively worn on a forearm and an upper arm of the patient. The passive compliant end-effectors prevent the patient from being subjected to secondary injury and realize a personalized rehabilitation through an inflatable contact arm axial dislocation adjustment device and a dynamic elastic adjustment device. The host computer control center is used for storing patient information, providing a quantitative index for upper limb activity range, muscle strength level, and upper limb coordination according to the position and posture information of the arm, and controlling a display of a training screen of the patient in the virtual environment.

Further, the position tracker includes a forearm position tracker and an upper arm position tracker. The forearm position tracker and the upper arm position tracker are respectively mounted on the upper arm and the forearm of the patient, and are used for real-time collecting the position and posture information of the upper arm and the forearm of the patient, and transmitting the collected position and posture information of the arm to the upper computer control center as feedback of the control system of the dual-arm rehabilitation robot.

Further, the dual-arm rehabilitation robot respectively drives the upper arm and the forearm of the patient for passive rehabilitation, active rehabilitation, and active-passive rehabilitation through the passive compliant end-effectors, thereby realizing a scientific rehabilitation process.

Further, the VR headset is specifically used to enable the patient to complete a game and a training task in the virtual environment, thereby realizing an interesting rehabilitation process.

Further, the patient information includes age, gender, condition, the muscle strength level, treatment time, rehabilitation change, shoulder joint activity range, elbow joint activity range, wrist activity range. The host computer control center gives the quantitative index to the upper limb activity range, the muscle strength level, and the upper limb coordination based on FM scale according to the position and posture information of the arm.

Further, the force-feedback glove is further used to stimulate the hand of the patient by vibration in the game and the task after setting, and gives the patient a training tactile feedback.

Further, the dynamic elastic adjustment device includes a mounting plate, a dynamic adjustment housing, an end cover, a spring, a spring lower block, a linear bearing and a telescopic column. The mounting plate, the dynamic adjustment housing, and the end cover are connected in sequence from top to bottom by screws. The spring is disposed within the dynamic adjustment housing. An upper end of the spring is connected to the mounting plate. A lower end of the spring fits through the end cover in a clearance fit by the spring lower block and the lower end of the spring extends to an end of the telescopic column of an inner hole of the dynamic adjustment housing to form a fixed connection. The other end of the telescopic column is provided with a connecting flange. The linear bearing is fixed in the inner hole of the dynamic adjustment housing and is in sliding fit with the telescopic column.

Further, the inflatable contact arm axial dislocation adjustment device includes an end outer ring, an end inner ring, and an inflatable arm contact ring. The end inner ring is rotationally disposed in an inner hole of the end outer ring coaxially. The inflatable arm contact ring is fixedly disposed in an inner hole of the end inner ring and synchronously rotates with the end inner ring.

Further, the end outer ring includes a semicircular end outer ring upper half and a semicircular end outer ring lower half. An end of the end outer ring upper half and an end of the end outer ring lower half are movably connected by a hinge, and the other end of the end outer ring upper half and the other end of the end outer ring lower half are plugged through a replaceable buckle. The end inner ring includes a semicircular end inner ring upper half and a semicircular end inner ring lower half. The end inner ring upper half is provided with the connecting flange. An end of the end inner ring upper half and an end of the end inner ring lower half are movably connected by the hinge, and the other end of the end inner ring upper half and the other end of the end inner ring lower half are plugged through the replaceable buckle.

Further, the immersive upper limb rehabilitation training system includes the VR third-person view display device. The VR third-person view display device is used for real-time displaying a patient's picture in the VR environment, which is convenient for a rehabilitation therapist to observe a rehabilitation effect of the patient.

Compared with the prior technology, the invention has the following advantages and technical effects.

The invention realizes a safe, scientific, interesting, systematic, personalized and data-oriented upper limb rehabilitation training process by providing the visual sensor height angle adjuster, the visual sensor, the passive compliant end effector, the dual-arm rehabilitation robot, the base, the position tracker, the VR headset, the force-feedback glove, the VR third-person view display device and the upper computer control center.

Shown in the Figures: 1: visual sensor height angle adjuster, 2: visual sensor, 3: passive compliant end-effector, 4: dual-arm rehabilitation robot, 5: base, 6-1: forearm position tracker, 6-2: upper arm position tracker, 7: VR headset, 8: force-feedback glove, 9: VR third-person view display device, 10: host computer control center, 11: mounting plate, 12: dynamic adjustment housing, 13: end cover, 14: end outer ring upper half, 15: inflatable arm contact ring, 16: end outer ring lower half, 17: replaceable buckle, 18: end inner ring lower half, 19: end inner ring upper half, 20: spring, 21: spring lower block, 22: linear bearing.

DESCRIPTION OF THE EMBODIMENTS

The invention will be further described below in conjunction with embodiments, but is not limited thereto.

Figure 1:
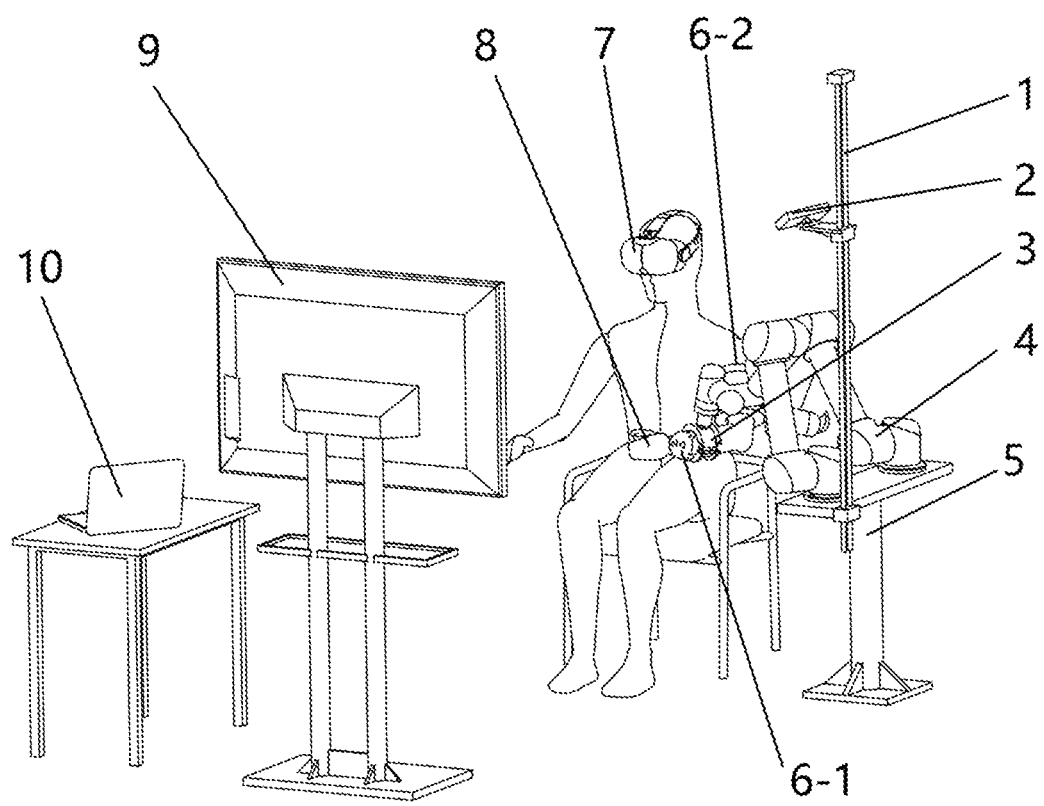
FIG. 1 is a schematic diagram of an immersive upper limb rehabilitation training system.

As shown in FIG. 1, an immersive upper limb rehabilitation training system includes a dual-arm rehabilitation robot 4, a base 5, a position tracker, a VR headset 7, a force-feedback glove 8, a host computer control center 10, passive compliant end-effectors 3 and a VR third-person view display device 9.

The dual-arm rehabilitation robot 4 is mounted on the base 5, and respectively drives an upper arm and a forearm of the patient for passive rehabilitation, active rehabilitation, and active and passive rehabilitation through the passive compliant end-effectors 3, thereby realizing a scientific rehabilitation process.

The visual sensor 2 is mounted on the base 5 through the visual sensor height angle adjuster 1. The visual sensor is used for recording a motion of the upper limb of the patient, extracting spatial position information of the upper limb of the patient, and feedback-controlling a motion of the dual-arm rehabilitation robot 4. The vision sensor height angle adjuster is used for mounting and adjusting the visual sensor to adapt to a parameter for height, arm length, and activity range of different patients, so as to obtain an optimal visual observation angle.

The position tracker is mounted on the arm of the patient, and is used for real-time collecting position and posture information of the arm of the patient, and transmitting the collected position and posture information of the arm to the upper computer control center 10 as a feedback of a control system of the dual-arm rehabilitation robot 4.

The VR headset 7 is worn on a head of the patient, and is used for bringing an immersive training experience to the patient through VR. The VR headset 7 is specifically used to enable the patient to complete a game and a training task in a virtual environment, thereby realizing an interesting rehabilitation process.

The force-feedback glove 8 is worn on a hand of the patient, and is used for enhancing the immersive training experience, improving a patient's reality in the virtual environment, and providing a force feedback parameter for a control of the dual-arm rehabilitation robot 4. In addition, the force-feedback glove 8 is further used to stimulate the hand of the patient by vibration in the game and the task after setting, and gives the patient a training tactile feedback to enhance a rehabilitation effect, thereby realizing a systematic rehabilitation process.

The passive compliant end-effectors 3 are mounted on an end of the dual-arm rehabilitation robot 4, and are respectively worn on the forearm and the upper arm of the patient. The passive compliant end-effectors 3 prevent the patient from being subjected to secondary injury and realize a personalized rehabilitation through an inflatable contact arm axial dislocation adjustment device and a dynamic elastic adjustment device.

The host computer control center 10 uses a computer for storing patient information including age, gender, condition, muscle strength level, treatment time, rehabilitation change, shoulder joint activity range, elbow joint activity range, wrist activity range, etc., for providing a quantitative index to upper limb activity range, the muscle strength level, and upper limb coordination based on FM scale according to the position and posture information of the arm, and for controlling a display of a training screen of the patient in the virtual environment, thereby realizing a data-oriented rehabilitation process.

The VR third-person view display device 9 is used for real-time displaying a patient's picture in the VR environment, which is convenient for a rehabilitation therapist to observe a rehabilitation effect of the patient.

The position tracker includes a forearm position tracker 6-1 and an upper arm position tracker 6-2. The forearm position tracker 6-1 and the upper arm position tracker 6-2 are respectively mounted on the upper arm and the forearm of the patient, and are used for real-time collecting the position and posture information of the upper arm and the forearm of the patient, and transmitting the collected position and posture information of the arm to the host computer control center 10 as feedback of the control system of the dual-arm rehabilitation robot 4, thereby realizing real-time monitoring and security protection.

Figure 2:
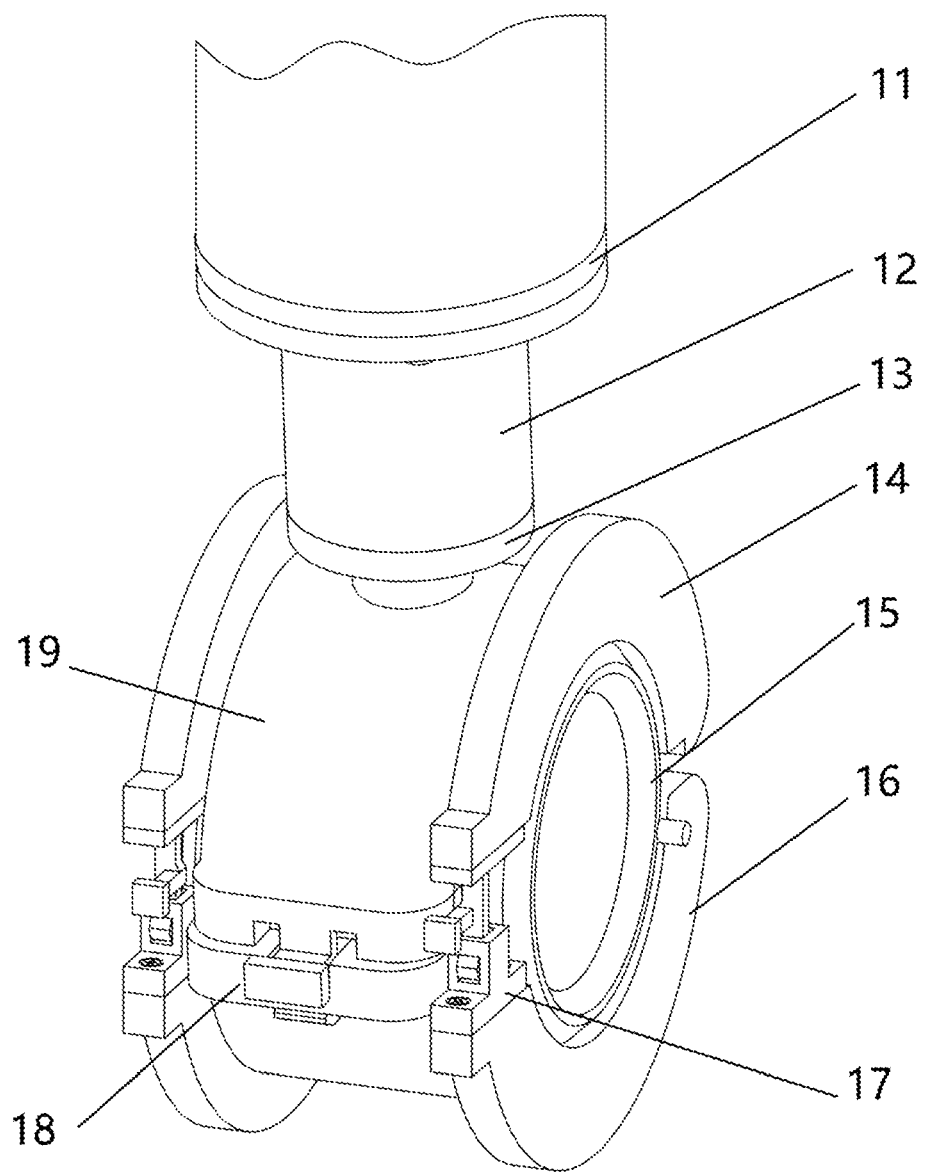
FIG. 2 is a structural schematic diagram of a passive compliant end effector according to an embodiment of the invention.
Figure 3:
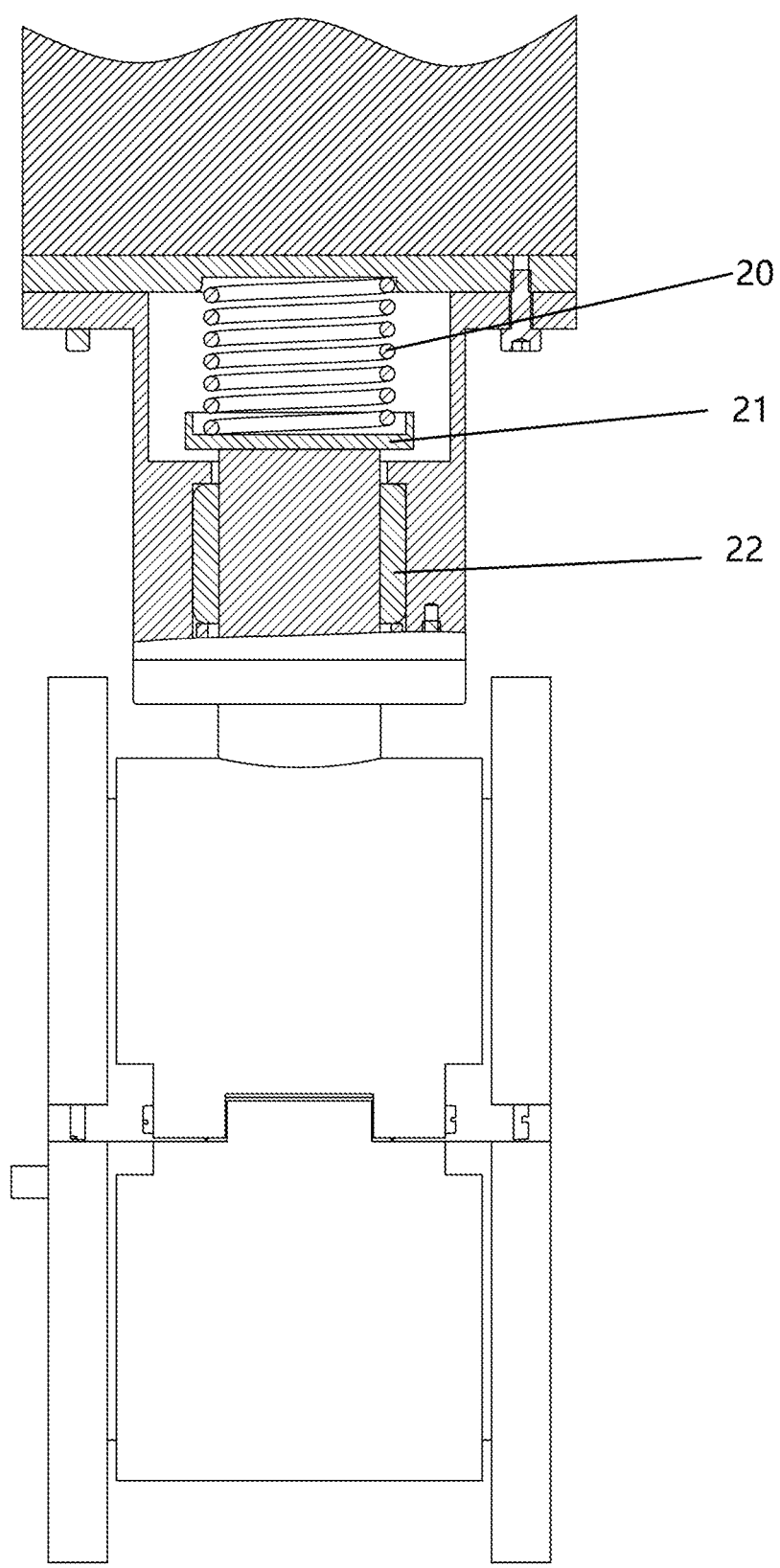
FIG. 3 is a cross-sectional view of the passive compliant end-effectors according to an embodiment of the invention.

Specifically, as shown in FIG. 2 and FIG. 3, the dynamic elastic adjustment device includes a mounting plate 11, a dynamic adjustment housing 12, an end cover 13, a spring 20, a spring lower block 21, a linear bearing 22 and a telescopic column. The mounting plate 11, the dynamic adjustment housing 12, and the end cover 13 are connected in sequence from top to bottom by screws. The spring 20 is disposed within the dynamic adjustment housing 12. An upper end of the spring 20 is connected to the mounting plate 11. A lower end of the spring 20 fits through the end cover 13 in a clearance fit by the spring lower block 21 and the lower end of the spring extends to an end of the telescopic column of an inner hole of the dynamic adjustment housing 12 to form a fixed connection. The other end of the telescopic column is provided with a connecting flange. The linear bearing 22 is fixed in the inner hole of the dynamic adjustment housing 12 and is in sliding fit with the telescopic column.

In the above embodiment, when the telescopic column receives a force in the direction of the spring axis, the spring 20 will contract. The passive flexible control protects the patient from secondary injury by the spring 20 absorbing energy due to positional deviation, arm tremor and antagonism of the patient during the control.

Specifically, as shown in FIG. 2 and FIG. 3, the inflatable contact arm axial dislocation adjustment device includes an end outer ring, an end inner ring, and an inflatable arm contact ring 15. The end inner ring is rotationally disposed in an inner hole of the end outer ring coaxially. The inflatable arm contact ring 15 is fixedly disposed in an inner hole of the end inner ring and synchronously rotates with the end inner ring.

The end outer ring includes a semicircular end outer ring upper half 14 and a semicircular end outer ring lower half 16. An end of the end outer ring upper half 14 and an end of the end outer ring lower half 16 are movably connected by a hinge, and the other end of the end outer ring upper half 14 and the other end of the end outer ring lower half 16 are plugged through a replaceable buckle 17. The end inner ring includes a semicircular end inner ring upper half 19 and a semicircular end-inner ring lower half 18. The end inner ring upper half 19 is provided with the connecting flange. An end of the end inner ring upper half 19 and an end of the end inner ring lower half 18 are movably connected by the hinge, and the other end of the end inner ring upper half 19 and the other end of the end inner ring lower half 18 are plugged through the replaceable buckle 17 for easy disassembly and wear. The end inner ring is rotationally disposed in the inner hole of the end outer ring coaxially. That is, the end inner ring can be relatively coaxially rotated in the inner hole of the end outer ring, but cannot be axially swayed, and satisfy the use of the patient with axial dislocation of the arm. The inflatable arm contact ring 15 is fixedly disposed in the inner hole of the terminal inner ring and synchronously rotates with the end inner ring. An outer peripheral wall of the inflatable arm contact ring is fixed on a wall of the inner hole of the end inner ring. The above embodiment can control the size of the inner hole of the inflatable arm contact ring 15 by the amount of inflation, thereby being suitable for the patient with different arm size parameter. The inflatable type also has a cushioning protection function compared to the conventional rigid contact. In addition, the use of a cloth having a large coefficient of friction on an inner peripheral wall of the inflatable arm contact ring 15 prevents relative changes in the position where the arm and the arm are connected, and prevents secondary injury caused by malposition.

In summary, the invention realizes a safe, scientific, interesting, systematic, personalized and data-oriented upper limb rehabilitation training process by providing the visual sensor height angle adjuster 1, the visual sensor 2, the passive compliant end effector 3, the dual-arm rehabilitation robot 4, the base 5, the position tracker, the VR headset 7, the force-feedback glove 8, the VR third-person view display device 9 and the upper computer control center 10.

Variations and modifications of the above-described embodiments may also be made by those skilled in the art in light of the above disclosure. Therefore, the invention is not limited to the detailed embodiments disclosed and described herein, and the modifications and variations of the invention are intended to fall within the scope of the appended claims.

What is claimed is:

1. An immersive upper limb rehabilitation training system, comprising a dual-arm rehabilitation robot, a base, a position tracker, a VR headset, a force-feedback glove, a host computer control center, and two passive compliant end-effectors; wherein the dual-arm rehabilitation robot is mounted on the base, and is adapted to drive an arm of a patient to move through the two passive compliant end-effectors;

a visual sensor is mounted on the base through being mounted on a height angle adjuster connected to the base; the visual sensor is used for recording a motion of the arm of the patient, extracting spatial position information of the arm of the patient, and feedback-controlling a motion of the dual-arm rehabilitation robot;

the position tracker is configured to be mounted on the arm of the patient, and is used for real-time collecting of position and posture information of the arm of the patient, and transmitting the collected position and posture information of the arm to the host computer control center as feedback of a control system of the dual-arm rehabilitation robot;

the VR headset is configured to be worn on a head of the patient, and is used for bringing an immersive training experience to the patient through virtual reality;

the force-feedback glove is configured to be worn on a hand of the patient, and is used for enhancing the immersive training experience, improving a patient's reality in a virtual environment, and providing a force feedback parameter for a control of the dual-arm rehabilitation robot;

the two passive compliant end-effectors are mounted on an end of the dual-arm rehabilitation robot, and are configured to be respectively worn on a forearm and an upper arm of the patient; the two passive compliant end-effectors prevent the patient from being subjected to secondary injury, and realize a personalized rehabilitation through an inflatable contact adjustment device for adjusting dislocation of the arm and a dynamic elastic adjustment device; and the host computer control center is used for storing patient information, providing a quantitative index for upper limb activity range, muscle strength level, and upper limb coordination according to the position and posture information of the arm, and controlling a display of a training screen of the patient in the virtual environment, wherein the dynamic elastic adjustment device comprises a mounting plate, a dynamic adjustment housing, an end cover, a spring, a spring lower block, a linear bearing, and a telescopic column; the mounting plate, the dynamic adjustment housing, and the end cover are connected in sequence from top to bottom by screws; the spring is disposed within the dynamic adjustment housing; an upper end of the spring is connected to the mounting plate; a lower end of the spring fits through the end cover in a clearance fit by the spring lower block, and the lower end of the spring extends to an end of the telescopic column of an inner hole of the dynamic adjustment housing to form a fixed connection; the other end of the telescopic column is provided with a connecting flange; the linear bearing is fixed in the inner hole of the dynamic adjustment housing and is in sliding fit with the telescopic column.

2. The immersive upper limb rehabilitation training system according to claim 1, wherein the position tracker comprises a forearm position tracker and an upper arm position tracker; the forearm position tracker and the upper arm position tracker are respectively mounted on the upper arm and the forearm of the patient, and are used for real-time collecting the position and posture information of the upper arm and the forearm of the patient, and transmitting the collected position and posture information of the arm to the host computer control center as feedback of the control system of the dual-arm rehabilitation robot.

3. The immersive upper limb rehabilitation training system according to claim 1, wherein the dual-arm rehabilitation robot respectively drives the upper arm and the forearm of the patient for passive rehabilitation, active rehabilitation, and active-passive rehabilitation through the two passive compliant end-effectors.

4. The immersive upper limb rehabilitation training system according to claim 1, characterized in that the VR headset is specifically used to enable the patient to complete a game and a training task in the virtual environment, thereby realizing an interesting rehabilitation process.

5. The immersive upper limb rehabilitation training system according to claim 1, wherein the patient information comprises age, gender, condition, the muscle strength level, treatment time, shoulder joint activity range, elbow joint activity range, wrist activity range; the host computer control center gives the quantitative index to the upper limb activity range, the muscle strength level, and the upper limb coordination based on Fugl-Meyer Assessment (FMA) scale according to the position and posture information of the arm.

6. The immersive upper limb rehabilitation training system according to claim 1, wherein the force-feedback glove is further used to stimulate the hand of the patient by vibration in a game and a task after setting, and gives the patient a training tactile feedback.

7. The immersive upper limb rehabilitation training system according to claim 1, wherein the inflatable contact adjustment device comprises an end outer ring, an end inner ring and an inflatable arm contact ring; the end inner ring is rotationally disposed in an inner hole of the end outer ring coaxially; the inflatable arm contact ring is fixedly disposed in an inner hole of the end inner ring and synchronously rotates with the end inner ring.

8. The immersive upper limb rehabilitation training system according to claim 7, wherein the end outer ring comprises a semicircular end outer ring upper half and a semicircular end outer ring lower half; an end of the end outer ring upper half and an end of the end outer ring lower half are movably connected by a hinge, and the other end of the end outer ring upper half and the other end of the end outer ring lower half are plugged through a replaceable buckle; the end inner ring comprises a semicircular end inner ring upper half and a semicircular end inner ring lower half; the end inner ring upper half is provided with the connecting flange; an end of the end inner ring upper half and an end of the end inner ring lower half are movably connected by the hinge, and the other end of the end inner ring upper half and the other end of the end inner ring lower half are plugged through the replaceable buckle.

9. The immersive upper limb rehabilitation training system according to claim 1, further comprising a VR third-person view display device; the VR third-person view display device is used for real-time displaying a patient's picture in the virtual environment.

* * * * *